United States Patent
Yukumatsu

(10) Patent No.: US 7,126,305 B2
(45) Date of Patent: Oct. 24, 2006

(54) APPARATUS FOR CORRECTING CURRENT VALUE OF THREE-PHASE ELECTRIC MOTOR AND CORRECTING METHOD

(75) Inventor: Norimitsu Yukumatsu, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/156,483

(22) Filed: Jun. 21, 2005

(65) Prior Publication Data
US 2006/0001394 A1   Jan. 5, 2006

(30) Foreign Application Priority Data
Jun. 21, 2004  (JP)  ............................ P2004-182943

(51) Int. Cl.
*G05D 23/275* (2006.01)

(52) U.S. Cl. ..................... 318/632; 318/810; 318/254; 318/138; 318/439; 318/803

(58) Field of Classification Search ................ 318/632, 318/810, 254, 138, 439, 603, 609, 608, 803, 318/807; 341/115
See application file for complete search history.

(56) References Cited

U.S. PATENT DOCUMENTS 6,215,426 B1 * 4/2001 Taniguchi et al. .......... 341/115

FOREIGN PATENT DOCUMENTS

| EP | 1 215 503 A2 | 6/2002 |
| EP | 1 359 663 A2 | 11/2003 |
| JP | A-05-091780 | 4/1993 |
| JP | A09-011918 | 1/1997 |
| JP | A 2003-333882 | 11/2003 |

* cited by examiner

*Primary Examiner*—Karen Masih
(74) *Attorney, Agent, or Firm*—Oliff & Berridge PLC

(57) ABSTRACT

An apparatus corrects a current value of a three-phase electric motor including a current detector that detects current of each of three phases including a first phase, a second phase, and a third phase. The apparatus includes a current-value correcting unit. When current of one of the first to third phase is zero-crossing, the current-value correcting unit corrects a current value of at least one of the others of the first to third phases on a basis of a correlation between detection values of the current detectors provided for the others of the first to third phases during a period in which the three-phase electric motor is operating.

9 Claims, 12 Drawing Sheets

POSITION DETECTION FROM ROTATOR

TO MICROCOMPUTER 1

APPARATUS FOR CORRECTING CURRENT VALUE OF THREE-PHASE ELECTRIC MOTOR AND CORRECTING METHOD

BACKGROUND OF THE INVENTION

1. Field of the Invention

The invention relates to an apparatus for correcting a current value of a three-phase electric motor and a correcting method, to achieve smooth rotation of the three-phase electric motor.

2. Description of the Related Art

In a related-art controller of a three-phase electric motor, resistors and amplifiers of current detectors of respective phases involve individual variations. Accordingly, outputs from the current detectors contain offset errors and/or gain errors. These errors result in a discrepancy between a set current value and a current value actually supplied to the three-phase electric motor, thereby creating an imbalance in currents of the three phases. This is a cause of generation of a torque ripple. In order to solve such a problem, JP Hei. 5-91780 A discloses a method for correcting a detected current value in the following manner.

First, one of the respective phases (U, V, and W) of the three-phase electric motor is taken as a reference phase (U). At the time of correction, offset errors (Δu, Δv, and Δw) of the current detectors for the respective phases are respectively obtained in a state where current flows in none of the phases of the three-phase electric motor. Next, a predetermined current is caused to flow only in the reference phase (U) and another phase (V). A gain error ($\Delta G_v$) of the current detector for the other phase (V) is obtained from outputs produced at this time by the current detectors for U and V phases. In addition, the predetermined current is caused to flow only in the reference phase (U) and still another phase (W). A gain error ($\Delta G_w$) of the current detector for the still other single phase (W) is obtained from outputs produced at this time by the current detectors for U and W phases. During operation of the three-phase electric motor, values ($I_u$, $I_v$, and $I_w$) detected by the current detectors for the respective phases are corrected with using the thus-obtained offset errors (Δu, Δv, and Δw) and gain errors ($\Delta G_v$ and $\Delta G_w$) of the current detectors for the respective phases, to supply current to the three-phase electric motor in accordance with the thus-corrected detection values ($I_{cu}$, $I_{cv}$, and $I_{cw}$) of the current detectors.

FIG. 1 is a schematic circuit diagram for explaining the correction method according to the related art. Transistors $Tr_{u1}$, $Tr_{u2}$, $Tr_{v1}$, $Tr_{v2}$, $Tr_{w1}$, and $Tr_{w2}$ are provided for the respective U, V, and W phases and constitute an inverter circuit. The transistors drive a three-phase electric motor M by means of a variable-voltage/variable-duty output, which is obtained by switching an output from a direct-current power supply V+. $R_u$, $R_v$, and $R_w$ denote resistors, which constitute the current detectors for the respective phase. FIG. 1 shows a case where a predetermined current "i" is caused to flow only in the reference phase (U) and another phase (V) to obtain outputs of the current detectors for U phase and V phase at this time.

FIG. 2 is a diagram showing another configuration for obtaining a detected current value of each phase for the purpose of correcting the current value detected by the current detector, and showing a case where a detected current value of U phase among the three phases is obtained. Transistors $T_{ru1}$ and $T_{ru2}$ are transistors provided for the U-phase of the inverter circuit. A predetermined current is supplied from a constant current supply source. The current is detected by the resistor $R_u$ constituting the current detector; amplified by an amplifier Amp; and output to a microcomputer, where the current is subjected to A/D conversion. Correction is made on the basis of the thus-converted detected current value.

Specifically, in the related art, correction is made by means of generating, for instance, a specific state where a predetermined current is caused to flow only in an arbitrary phase at the time of correcting a detected current value.

SUMMARY OF THE INVENTION

A current detector includes a resistor and an amplifier. However, each element involves individual variation. Therefore, even if one and the same current value is detected, current values detected by detectors may vary.

In order to improve accuracy of control of the three-phase electric motor, offset errors included in outputs from current detectors for the respective phases have been detected and corrected. However, to this end, current values must be detected accurately, and a device therefor is required.

Meanwhile, in order to smoothly rotationally drive the three-phase electric motor, if current having the same value flows in plural phases at a certain time point, it is required to make detected current values be one and the same value. In other words, instead of improving absolute accuracy of current in the respective phases (U, V, and W phases), relative accuracy among current in the respective phases (U, V, and W phases) may be improved.

Accordingly, the invention provides an apparatus and a method for correcting detected current values of a three-phase electric motor by means of making correction to improve relative accuracy among current detectors, without using a special device.

According to one embodiment of the invention, an apparatus corrects a current value of a three-phase electric motor including a current detector that detects current of each of three phase including a first phase, a second phase, and a third phase. The apparatus includes a current-value correcting unit. When current of one of the first to third phase is zero-crossing, the current-value correcting unit corrects a current value of at least one of the others of the first to third phases on a basis of a correlation between detection values of the current detectors provided for the others of the first to third phases during a period in which the three-phase electric motor is operating.

According to one embodiment of the invention, the current-value correcting unit may correct the current value of the at least one of the second phase and the third phase on a basis of one of (a) a correlation between the detection values of the current detectors provided for the second and third phases at a time of the zero-cross of the current of the first phases in a course of rising and (b) a correlation between the detection values of the current detectors provided for the second and third phases at a time of the zero-cross of the current of the first phases in a course of falling.

According to one embodiment of the invention, the current-value correcting unit may obtain the detection values of the current detectors provided for the second and third phases when a current value of the three-phase electric motor is equal to a first value, a second value or a third value. The first value>the second value>the third value.

According to one embodiment of the invention, the apparatus may further include a storage unit that stores detection values of the current detectors provided for the respective first, second and third phases when current of the three-phase electric motor is equal to 0 ampere. When current of one of the three phases is equal to a corresponding detection value stored in the storage unit, the current-value correcting unit determines that the one of the three phases is zero-crossing.

According to one embodiment of the invention, a method for correcting a current value of a three-phase electric motor including a current detector that detects current of each of three phases including a first phase, a second phase, and a third phase, the method includes, when current of one of the first to third phase is zero-crossing, correcting a current value of at least one of the others of the first to third phases on a basis of a correlation between detection values of the current detectors provided for the others of the first to third phases during a period in which the three-phase electric motor is operating.

According to the structures described above, since the detected current values of the three-phase electric motor are relatively corrected, the detected current values, which vary to due to variations of the current detectors, can be corrected without using a special device. Therefore, the correction can be made easily.

Also, the correction of the detected current values does not require generation of a specific state, such as a state where a predetermined current is caused to flow only in a specific phase. Therefore, for instance, even after shipment of a product, such as a power steering system, equipped with a three-phase electric motor, detected current values can be corrected as required so long as the product is in use. Accordingly, a correction process may be eliminated from a pre-shipment inspection of the product.

Also, even when degradation attributable to a usage state, environment, and the like, of the product leads to further individual variations in resistors, amplifiers, and the like, of current detectors of respective phases, detected current values can be corrected as required so long as the product is in use, whereby the detected current values can be corrected in accordance with the individual variations even after shipment of the product.

Furthermore, since a variety of current patterns exist, correction accuracy can be improved during use of a product equipped with a three-phase electric motor.

DETAILED DESCRIPTION OF EMBODIMENTS OF THE INVENTION

Figure 1:
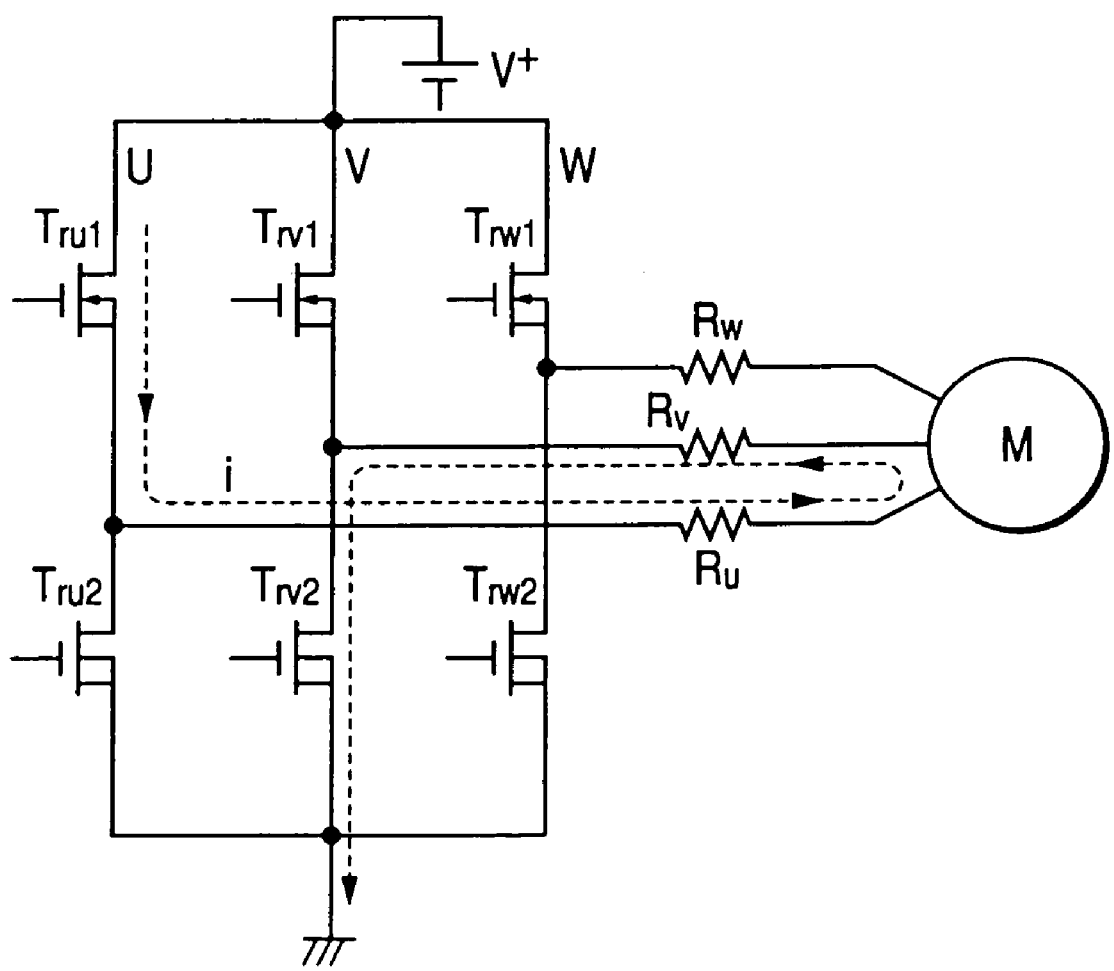
FIG. 1 is a schematic circuit diagram for explaining a related-art correction method.
Figure 2:
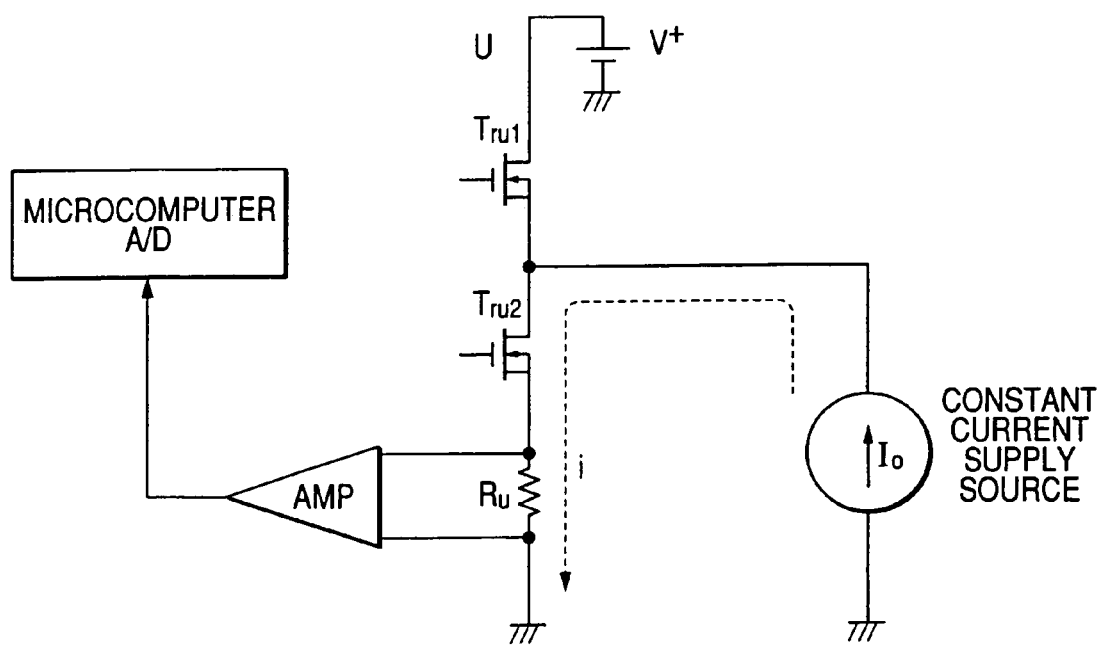
FIG. 2 is another schematic circuit diagram for explaining the related-art correction method.
Figure 3:
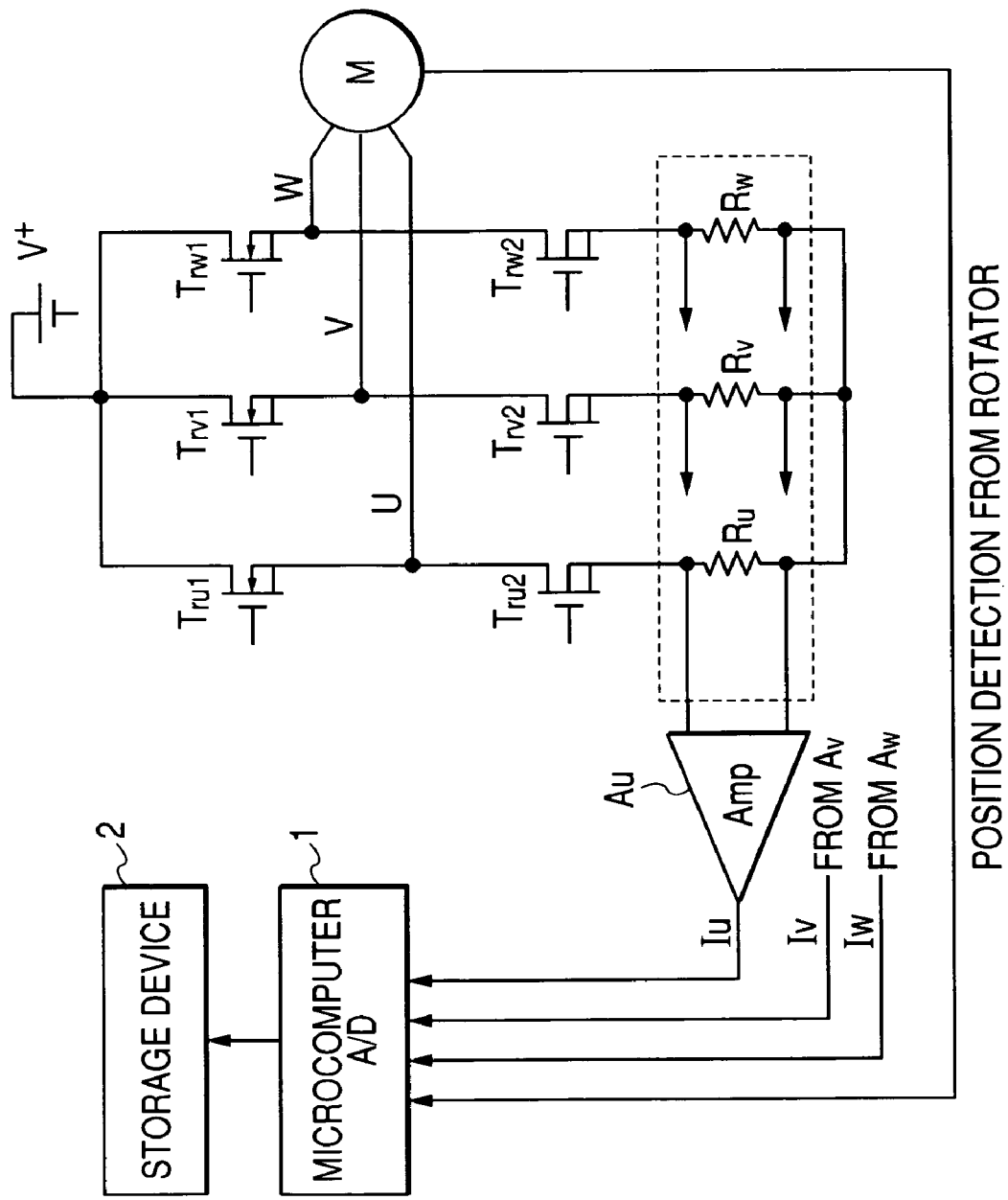
FIG. 3 is a view showing an overview of the configuration of a control circuit, for a three-phase electric motor, to which a correction method according to the present invention is applied.

FIG. 3 is a view showing an overview of configuration of a control circuit for a three-phase electric motor. A correcting method according to an embodiment of the invention is applied to the control circuit. Transistors $T_{ru1}$, $T_{ru2}$, $T_{rv1}$, $T_{rv2}$, $T_{rw1}$, and $T_{rw2}$ provided for the respective phases of U, V, and W, constitute an inverter circuit; and drive a three-phase electric motor M by means of variable-voltage/variable-duty outputs obtained by switching an output from a direct-current power supply V+. Meanwhile, control of these operations is exercised by a microcomputer 1. $R_u$, $R_v$, and $R_w$ are resistors, which constitute current detectors for the respective phases. Currents flowing in the respective phases are detected by these resistors; are amplified by amplifiers $A_u$, $A_v$, and $A_w$ for the respective phases and output to the microcomputer 1, where the thus-detected currents are subjected to A/D conversion; and stored in a storage device 2. Here, description on the amplifiers $A_v$ and $A_w$ are omitted.

Figure 4:
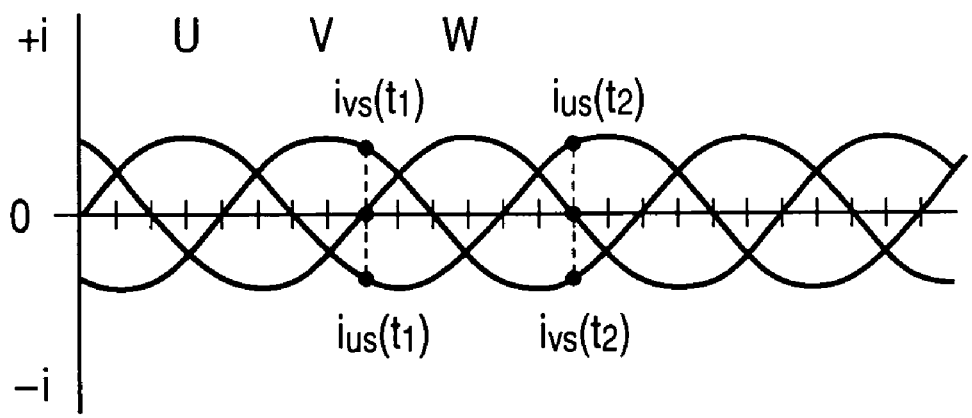
FIG. 4 is a waveform diagram of a three-phase alternating current for explaining the correction method according to the present invention (showing a case where a current value level is relatively low)

FIG. 4 is a waveform diagram showing a three-phase alternating current, for explaining the correcting method according to this embodiment of the invention. FIG. 4 shows a waveform where a level of a current value of the motor is relatively low. As is apparent from the drawing, in the waveform of the three-phase alternating current, when a current value of one phase is 0, absolute values of current values of the two remaining phases are equal to each other. For instance, when a W-phase current value is 0, an absolute value of a U-phase current value $|i_{us}(t1)|$ is equal to an absolute value of a V-phase current value $|i_{vs}(t1)|$, and an absolute value of a U-phase current value $|i_{us}(t2)|$ is equal to an absolute value of a V-phase current value $|i_{vs}(t2)|$.

$$|i_{us}(t1)|=|i_{vs}(t1)|$$

$$|i_{us}(t2)|=|i_{vs}(t2)|$$

where $i_{us}(t1)$ and $i_{vs}(t1)$ are current values when W-phase current is zero-crossing in the course of rising; and $i_{us}(t2)$ and $i_{vs}(t2)$ are current values when the W-Phase current is zero-crossing in the course of falling. Similarly, also when the U-phase current value or the V-phase current value is 0, absolute values of current values of the two remaining phases are equal to each other.

Meanwhile, a zero-cross timing of the W-phase is a time point when the detected current value of W phase is equal to a stored current value ($DI_w$), which is a detected and stored current value of W phase when current of the three-phase electric motor—which will be described later—is 0 ampere. In the case of the U-phase and the V-phase, a time point when the detected current value of each of U and V phases is equal to each of the stored values $DI_u$ and $DI_v$ is the zero-cross timing of each of the U-phase and V-phase.

Figure 5:
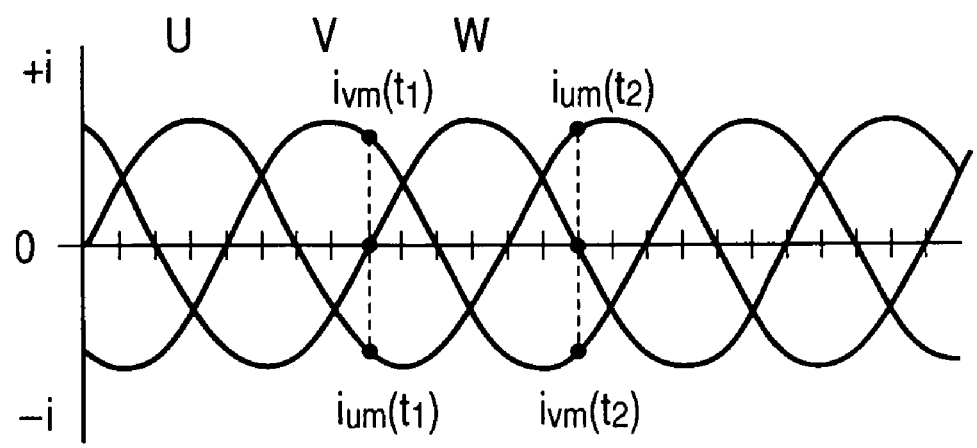
FIG. 5 is a waveform diagram of a three-phase alternating current for explaining the correction method according to the present invention (showing a case where a current value level is moderate)

FIG. 5 shows a waveform where a current value level of a motor is relatively medium. As is the case in FIG. 4, in the waveform of the three-phase alternating current, when a current value of one phase is 0, absolute values of current values of the two remaining phases are equal to each other. When a W-phase current value is 0, an absolute value of a U-phase current value $|i_{um}(t1)|$ is equal to an absolute value of a V-phase current value $|i_{vm}(t1)|$, and an absolute value of a U-phase current value $|i_{um}(t2)|$ is equal to an absolute value of a V-phase current value $|i_{vm}(t2)|$.

$$|i_{um}(t1)|=|i_{vm}(t1)|$$

$$|i_{um}(t2)|=|i_{vm}(t2)|$$

where $i_{um}(t1)$ and $i_{vm}(t1)$ are current values when the W-Phase current is zero-crossing in the course of rising; and $i_{um}(t2)$ and $i_{vm}(t2)$ are current values when the W-phase current is zero-crossing in the course of falling.

Meanwhile, a zero-cross timing of the W-phase is a time point when the detected current value of W phase is equal to the stored current value ($DI_w$), which is the detected and stored current value of W phase when current of the three-phase electric motor M—which will be described later—is 0 ampere. In the case of the U-phase and the V-phase, a time point when the detected current value of each of U and V phases is equal to each of the stored values $DI_u$ and $DI_v$ is the zero-cross timing of each of the U-phase and V-phase.

Figure 6:
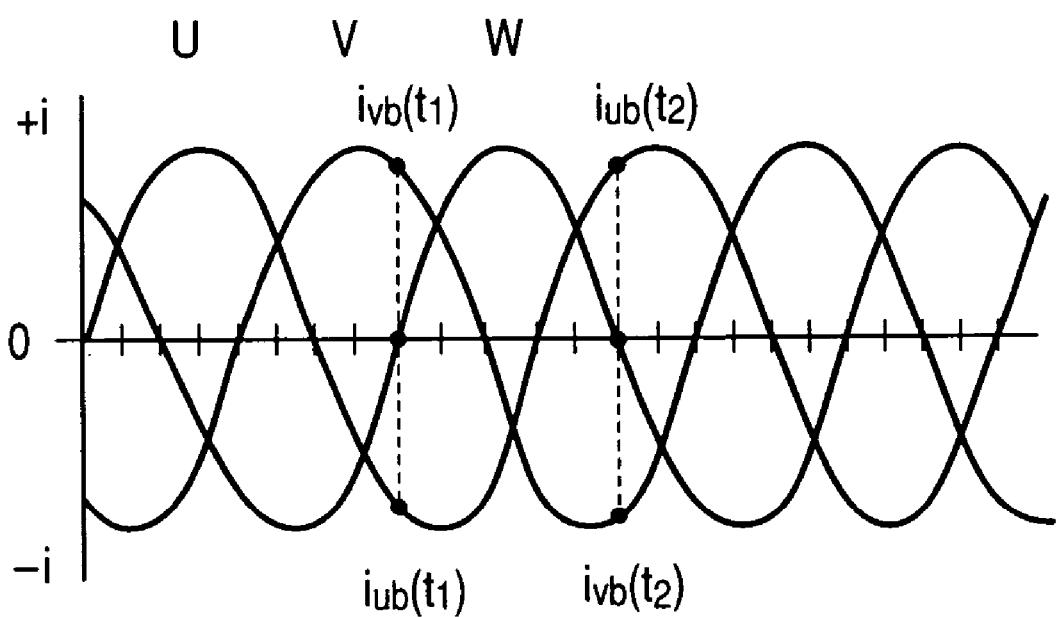
FIG. 6 is a waveform diagram of a three-phase alternating current for explaining the correction method according to the present invention (showing a case where a current value level is relatively high)

FIG. 6 shows a waveform where a level of a current value of the motor M is relatively high. As in the case of FIG. 4, in the waveform of the three-phase alternating current, when a current value of one phase is 0, absolute current values of the two remaining phases are equal to each other. When a W-phase current value is 0, an absolute value of a U-phase current value $|i_{ub}(t1)|$ is equal to an absolute of a V-phase current value $|i_{vb}(t1)|$, and an absolute value of a U-phase current value $|i_{ub}(t2)|$ is equal to an absolute value of a V-phase current value $|i_{vb}(t2)|$.

$$|i_{ub}(t1)|=|i_{vb}(t1)|$$

$$|i_{ub}(t2)|=|i_{vb}(t2)|$$

where $|i_{ub}(t1)|$ and $|i_{vb}(t1)|$ are current values when W-phase current is zero-crossing in the course of rising; and $|i_{ub}(t2)|$ and $|i_{vb}(t2)|$ are current values when the W-phase-current is zero-crossing in the course of falling.

Meanwhile, a zero-cross timing of the W-phase is a time point when the detected current value of W phase is equal to the stored current value ($DI_w$), which is the detected and stored current value of W phase when current of the three-phase electric motor M—which will be described later—is 0 ampere. In the case of the U-phase and the V-phase, a time point when the detected current value of each of U and V phases is equal to each of the stored values $DI_u$ and $DI_v$ is the zero-cross timing of each of the U-phase and V-phase.

Figure 7:
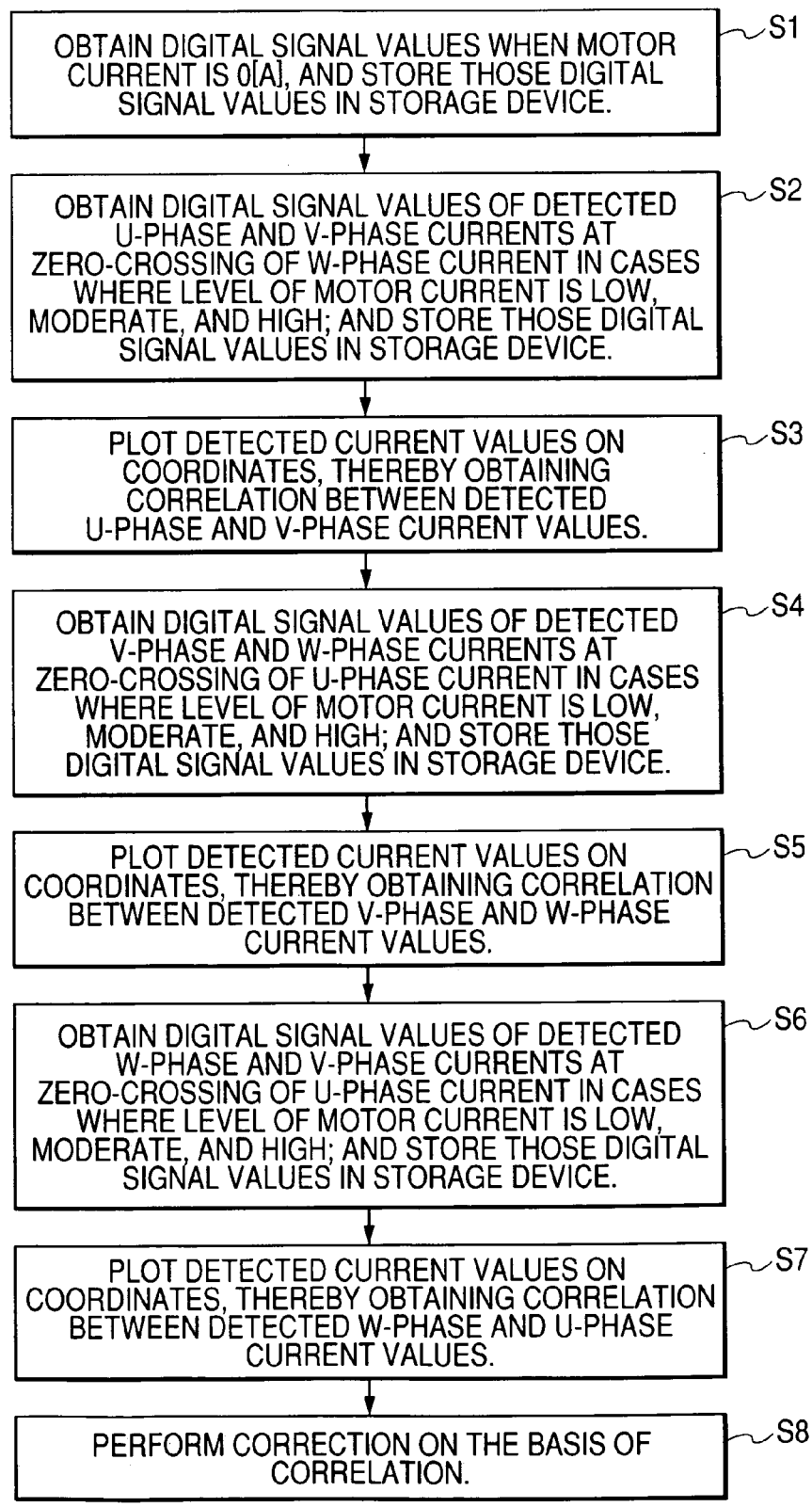
FIG. 7 is a flowchart for explaining the correction method of the present invention.

FIG. 7 is a flowchart for explaining the correcting method according to this embodiment of the invention. The control performed in the flowchart is executed by the microcomputer 1 shown in FIG. 3. Hereinbelow, the flowchart will be described by reference to FIG. 3.

[Current Values Detected by Current Detectors for Respective Phases when Motor Current is 0 [A]]

(1) First, outputs of the current detectors for the respective phases when the motor current is 0 ampere; that is, when the motor is not energized, are obtained as offset errors. Current values at this time are detected via the resistors $R_u$, $R_v$, and $R_w$ constituting the current detectors. The detected current values $I_u$, $I_v$, and $I_w$, which have been amplified by the amplifiers (Amp) $A_u$, $A_v$, and $A_w$ for the respective phases, are output to the microcomputer 1. The microcomputer 1 performs A/D conversion of the detected current values $I_u$, $I_v$, and $I_w$, thereby obtaining digital signals $DI_u$, $DI_v$, and $DI_w$, which indicate offset errors of the current detectors for the respective phases. Subsequently, the thus-obtained digital signals $DI_u$, $DI_v$, and $DI_w$ are stored in the storage device 2 (S1). The storage device 2 is implemented by, for instance, EEPROM.

[Current Values Detected by Current Detectors for U and V Phases when W-Phase Current is Zero-Crossing]

(2) Next, the motor is driven; and when a level of a current value is relatively low as shown in FIG. 4, current values $I_{us}(t1)$ and $I_{us}(t2)$ detected by the current detector for the U phase, and $I_{vs}(t1)$ and $I_{vs}(t2)$ detected by the current detector for the V phase, at the time of zero-crossing of the W-phase current are output to the microcomputer 1. The microcomputer 1 performs A/D conversion of the detected current values $I_{us}(t1)$, $I_{us}(t2)$, $I_{vs}(t1)$, and $I_{vs}(t2)$, thereby obtaining digital signal values $DI_{us}(t1)$, $DI_{us}(t2)$, $DI_{vs}(t1)$, and $DI_{vs}(t2)$. The thus-obtained signal values are stored in the storage device 2.

Similarly, digital signal values $DI_{um}(t1)$, $DI_{um}(t2)$, $DI_{vm}(t1)$, and $DI_{vm}(t2)$, at the time when the level of the current value is moderate as shown in FIG. 5, are obtained and stored in the storage device.

Furthermore, digital signal values $DI_{ub}(t1)$, $DI_{ub}(t2)$, $DI_{vb}(t1)$, and $DI_{vb}(t2)$, at the time when the level of the current value is relatively high as shown in FIG. 6, are obtained and stored in the storage device (S2).

(3) Next, correlation between the thus-obtained detected current values is obtained. More specifically, as shown in FIG. 8, absolute values of the digital signals—obtained through A/D conversion of the detected current values— are plotted in coordinates, which show actual current values of the motor M on the X axis and current values detected by the detectors on the Y axis.

Figure 8:
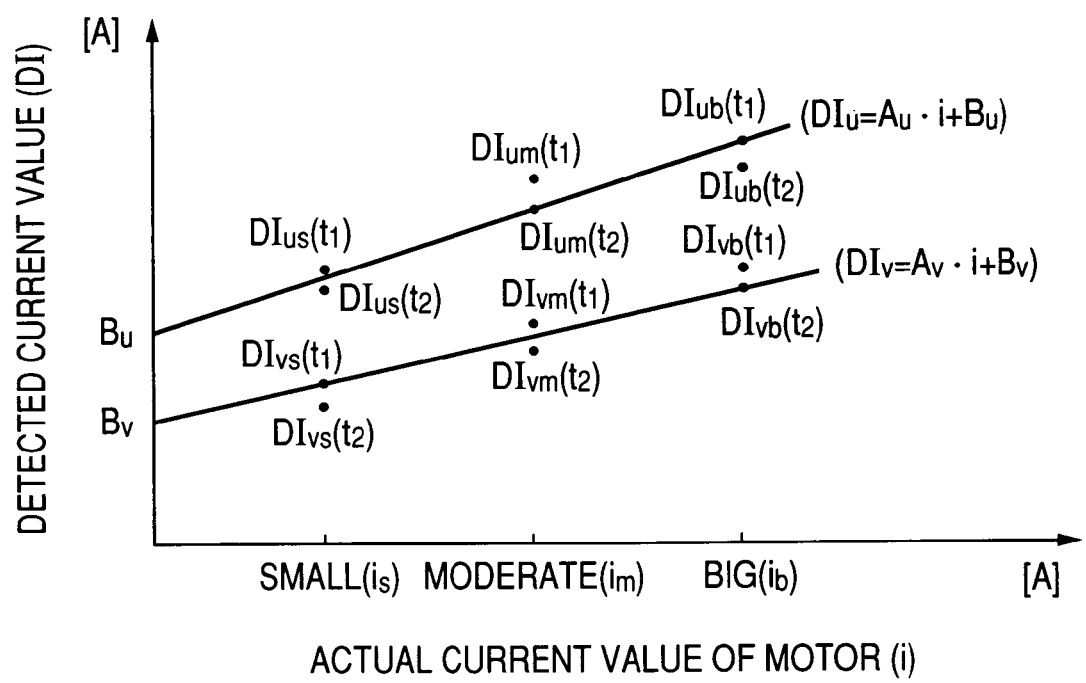
FIG. 8 is a view in which absolute digital signal values of U-phase and V-phase currents detected at the time when a W-phase current value is 0 [A] in cases where an actual motor current value level is low, moderate, and high, are plotted on coordinates.

As shown in FIG. 8, absolute values of the digital signals of detected U-phase and V-phase currents acquired when the actual current value of the motor is 0 ampere and those, which have been obtained in advance when the current value level is low, moderate, and high, are plotted. Meanwhile, with regard to the actual current values of the motor on the X-axis, it is necessary to select relatively high, moderate, and relatively low values, but not necessary to select specific accurate values.

Next, from the distribution of the plotted absolute values of the U-phase detected currents, a straight line ($DI_u=A_u \cdot i + B_u$) extending along the distribution is obtained ($B_u$ is a value detected when the U-phase current is 0 ampere). Similarly, from the distribution of the plotted absolute values of the V-phase detected currents, a straight line ($DI_v=A_v \cdot i +$ $B_v$) extending along the distribution is obtained ($B_v$ is a value detected when the V-phase current is 0 [A]).

The following equation is obtained by eliminating "i" from the two above equations:

$$DI_u=(A_u/A_v)DI_v+B_u-(A_u/A_v)B_v; \text{ or}$$

$$DI_v=(A_v/A_u)DI_u+B_v-(A_v/A_u)B_u.$$

The above equations represent correlation between the U-phase detected currents and V-phase detected currents (S3).

Meanwhile, when the distribution of the plotted detected current value does not fit a straight line, but fits, for instance, a quadratic curve, correlation between the quadratic curve pertaining to the detected current of the U-phase and the same of the V-phase is obtained. The same is also applied to cases where the U-phase or V-phase current is zero-crossing, which will be described below.

[Current Values Detected by Current Detectors for V and W Phases when U-Phase Current is Zero-Crossing]

(4) Similarly, the motor is driven; and when the level of the current value is relatively low as shown in FIG. 4, current values $I_{vs}(t1)$ and $I_{vs}(t2)$ detected by the current detector for the V phase and $I_{ws}(t1)$ and $I_{ws}(t2)$ detected by the current detector for the W phase, at the time of zero-cross of the U-phase current, are output to the microcomputer 1. The microcomputer 1 performs A/D conversion of the detected current values $I_{vs}(t1)$, $I_{vs}(t2)$, $I_{ws}(t1)$, and $I_{ws}(t2)$, thereby obtaining digital signal values $DI_{vs}(t1)$, $DI_{vs}(t2)$, $DI_{ws}(t1)$, and $DI_{ws}(t2)$. The thus-obtained signal values are stored in the storage device 2.

Similarly, digital signal values $DI_{vm}(t1)$, $DI_{vm}(t2)$, $DI_{wm}(t1)$, and $DI_{wm}(t2)$, at the time when the level of the current value is moderate as shown in FIG. 5, are obtained and stored in the storage device.

Furthermore, digital signal values $DI_{vb}(t1)$, $DI_{vb}(t2)$, $DI_{wb}(t1)$, and $DI_{wb}(t2)$, at the time when the level of the current value is relatively high as shown in FIG. 6, are obtained and stored in the storage device (S4).

(5) Next, correlation among the thus-obtained detected current values is obtained. More specifically, as shown in FIG. 9, absolute values of the digital signals—obtained through A/D conversion of the detected current values—are plotted in coordinates, which show actual current values of the motor M on the X axis and current values detected by the detectors on the Y axis.

Figure 9:
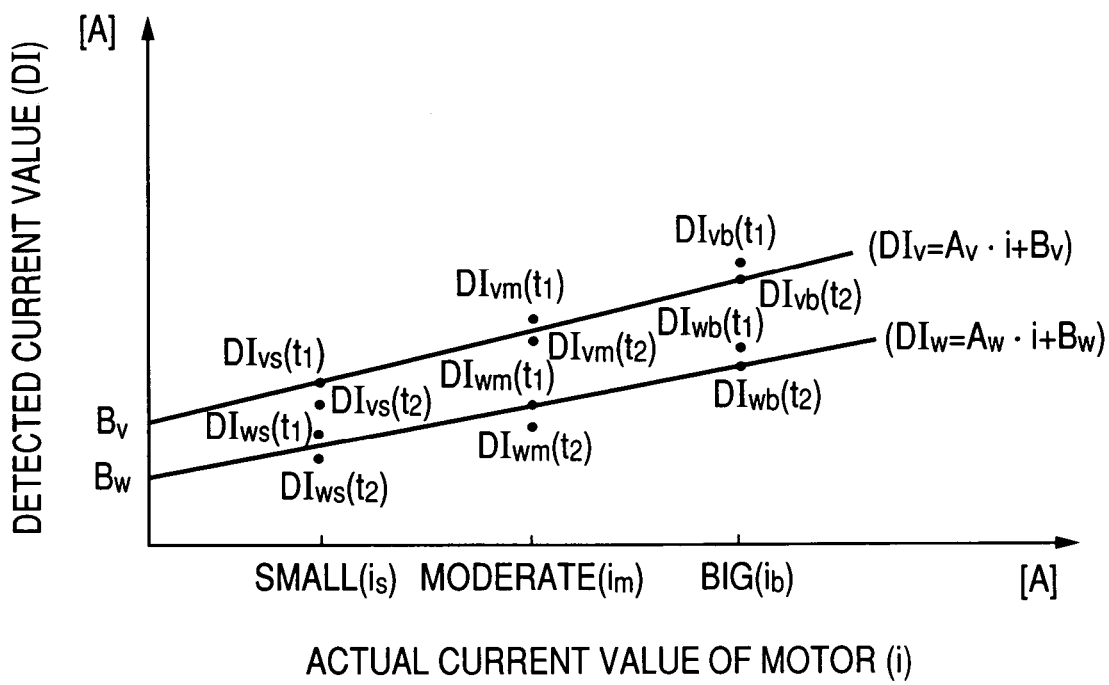
FIG. 9 is a view in which absolute digital signal values of detected V-phase and W-phase currents detected at the time when a U-phase current value is 0 [A] in cases where the actual motor current value level is low, moderate, and high, are plotted on coordinates.

As shown in FIG. 9, absolute values of the digital signals of detected V-phase and W-phase currents in a case where the actual current value of the motor M is 0 ampere and those, which have been obtained in advance when the current value level is low, moderate, and high, are respectively plotted. Meanwhile, with regard to the actual current values of the motor on the X-axis, it is necessary to select relatively high, moderate, and relatively low values, but not necessary to select specific accurate values.

Next, from the distribution of the plotted absolute value of the V-phase detected currents, a straight line ($DI_v=A_v\cdot i+B_v$) extending along the distribution is obtained ($B_v$ is a value detected when the V-phase current is 0 ampere). Similarly, from the distribution of the plotted absolute value of the W-phase detected currents, a straight line ($DI_w=A_v\cdot i+B_w$) extending along the distribution is obtained ($B_w$ is a value detected when the W-phase current is 0 ampere).

The following equation is obtained by eliminating "i" from the two above equations:

$$DI_v=(A_v/A_w)DI_w+B_v-(A_v/A_w)B_w; \text{ or}$$

$$DI_w=(A_w/A_v)DI_v+B_w-(A_w/A_v)B_v.$$

The above equations represent correlation between the V-phase detected currents and the W-phase detected currents (S5).

[Current Values Detected by Current Detectors for W and U Phases when V-Phase Current is Zero-Crossing]

(6) Similarly, the motor is driven; and when the level of the current value is relatively low as shown in FIG. 4, current values $I_{ws}(t1)$ and $I_{ws}(t2)$ detected by the current detector for the W phase and $I_{us}(t1)$ and $I_{us}(t2)$ detected by the current detector for the U phase, at the time of zero-crossing of the V-phase current, are output to the microcomputer 1. The microcomputer 1 performs A/D conversion of the detected current values $I_{ws}(t1)$, $I_{ws}(t2)$, $I_{us}(t1)$, and $I_{us}(t2)$, thereby obtaining digital signal values $DI_{ws}(t1)$, $DI_{ws}(t2)$, $DI_{us}(t1)$, and $DI_{us}(t2)$. The thus-obtained signal values are stored in the storage device 2.

Similarly, digital signal values $DI_{wm}(t1)$, $DI_{wm}(t2)$, $DI_{um}(t1)$, and $DI_{um}(t2)$, at the time when the level of the current value is relatively moderate as shown in FIG. 5, are obtained and stored in the storage device.

Furthermore, digital signal values $DI_{wb}(t1)$, $DI_{wb}(t2)$, $DI_{ub}(t1)$, and $DI_{ub}(t2)$, at the time when the level of the current value is relatively high as shown in FIG. 6, are obtained and stored in the storage device (S6).

(7) Next, a correlation among the thus-obtained detected current values is obtained. More specifically, as shown in FIG. 10, absolute values of the digital signals—obtained through A/D conversion of the detected current values—are plotted in coordinates, which show actual current values of the motor M on the X axis and current values detected by the detectors on the Y axis.

Figure 10:
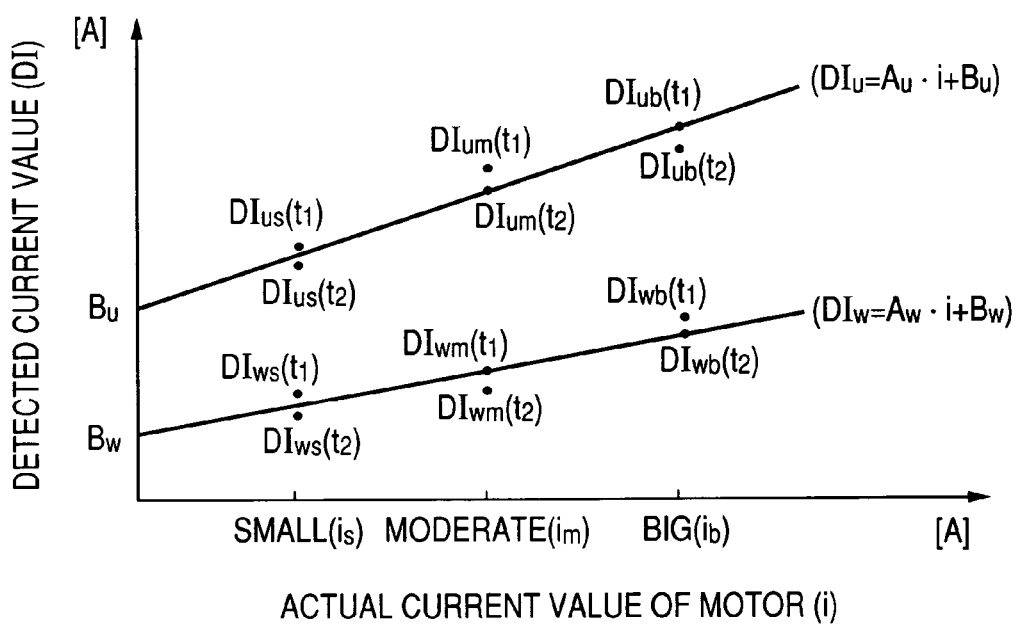
FIG. 10 is a view in which absolute digital signal values of W-phase and U-phase currents detected at the time when a V-phase current value is 0 [A] in cases where the actual motor current value level is low, moderate, and high, are plotted on coordinates.

As shown in FIG. 10, absolute values of the digital signal values of detected W-phase and U-phase current of a case where the actual current value of the motor is 0 ampere and those, which have been obtained in advance when the level of the current value is low, moderate, and high, are respectively plotted. Meanwhile, Meanwhile, with regard to the actual current values of the motor on the X-axis, it is necessary to select relatively high, moderate, and relatively low values, but not necessary to select specific accurate values.

Next, from the distribution of the plotted absolute values of the W-phase detected currents, a straight line ($DI_w=A_w\cdot i+B_w$) extending along the distribution is obtained ($B_w$ is a value detected when the W-phase current is 0 ampere). Similarly, from the distribution of the plotted absolute values of the U-phase detected currents, a straight line ($DI_u=A_u\cdot i+B_u$) extending along the distribution is obtained ($B_u$ is a value detected when the U-phase current is 0 ampere).

The following equation is obtained by eliminating "i" from the two above equations:

$$DI_w=(A_w/A_u)DI_v+B_w-(A_w/A_u)B_u; \text{ or}$$

$$DI_u=(A_u/A_w)DI_w+B_u-(A_u/A_w)B_w.$$

The above equations represent correlation between the W-phase detected currents and U-phase detected currents (S7).

[Correction on the Basis of Correlation between Phases]

(8) The following conversion can be performed with using the equations obtained in (S3), (S5), and (S7).

(1) In a case of converting V-phase values and W-phase values with using U-phase values as a reference, the following equations can be used:

$$DI_{v(u)}=(A_w/A_v)DI_v+B_u-(A_u/A_v)B_v;\text{ and}$$

$$DI_{w(u)}=(A_u/A_w)DI_w+B_u-(A_u/A_w)B_w.$$

(2) In a case of converting U-phase values and W-phase values with using V-phase values as a reference, the following equations can be used:

$$DI_{u(v)}=(A_v/A_u)DI_u+B_v-(A_v/A_u)B_u;\text{ and}$$

$$DI_{w(v)}=(A_v/A_w)DI_w+B_v-(A_v/A_w)B_w.$$

(3) In a case of converting U-phase values and V-phase values with using W-phase values as a reference, the following equations can be used:

$$DI_{u(w)}=(A_w/A_u)DI_u+B_w-(A_w/A_u)B_u;\text{ and}$$

$$DI_{v(w)}=(A_w/A_v)DI_v+B_w-(A_w/A_v)B_v.$$

A correcting method according to a second embodiment of the invention will be described below. The correcting method uses one of the three phases as a reference phase, and when a current value of one of the remaining two phases is zero-crossing, corrects a detected current value of the other of the remaining two phases to be equal to a detected current value of the reference value. Furthermore, when the other of the remaining two phases is zero crossing, the correcting method corrects the detected current value of the one of the remaining two phases to be equal to a detected current value of the reference value. According to this method, the detected current value of the remaining two phases can be corrected to be equal to the detected current values of the reference phase, thereby resolving offset errors.

In this embodiment, U phase is used as a reference phase. However, it should be noted that if another phase is used as a reference phase, similar correction for detected current values can be made.

Figure 11:
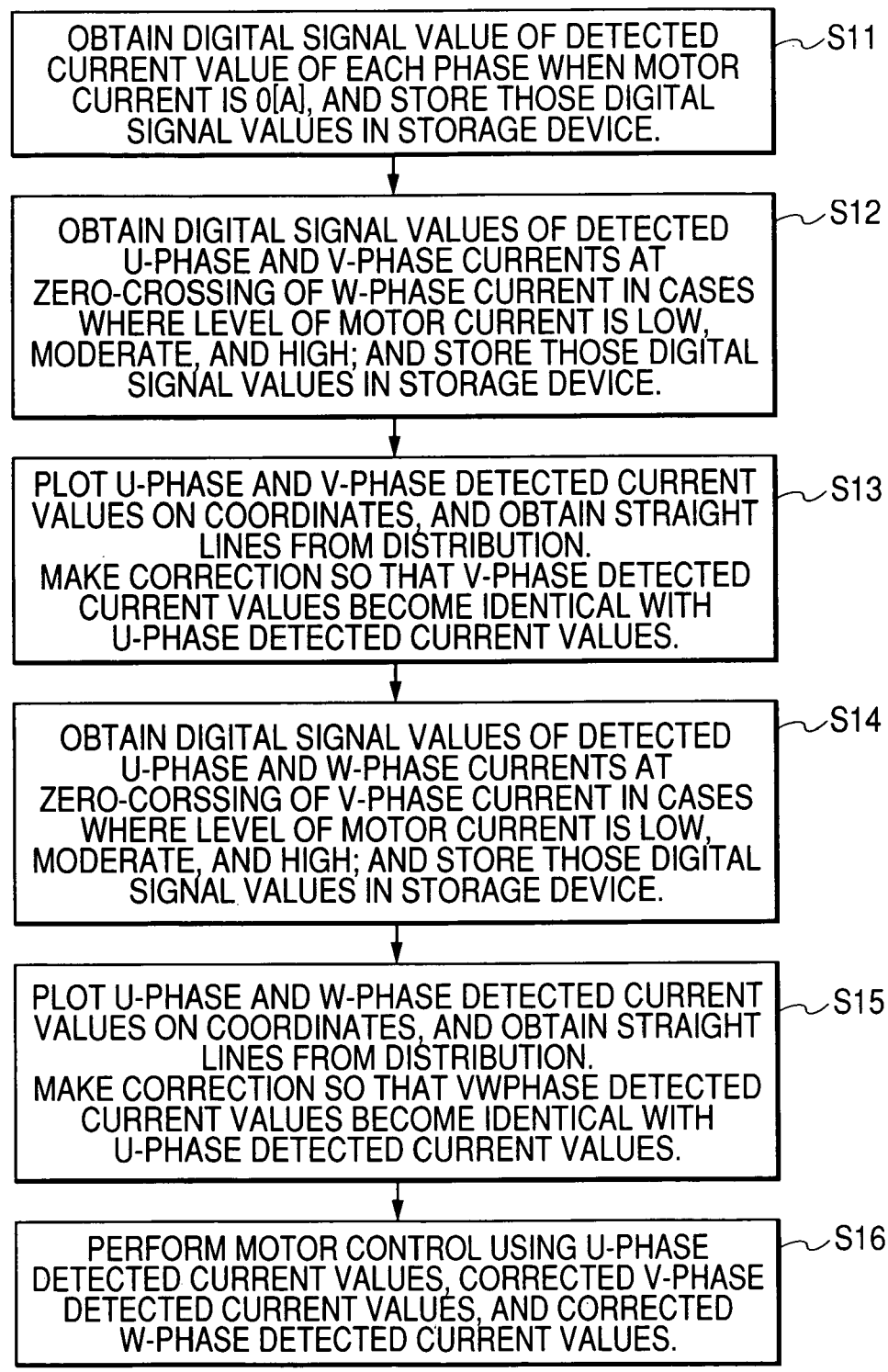
FIG. 11 is a flowchart explaining the correcting method according to a second embodiment of the invention.

FIG. 11 is a flowchart explaining the correcting method according to the second embodiment of the invention. The control performed in the flowchart is executed by the microcomputer 1 shown in FIG. 3. Hereinbelow, the flowchart will be described by reference to FIG. 3.

In step 11, outputs of the current detectors for the respective phases when the motor current is 0 ampere; that is, when the motor is not energized, are obtained as offset errors. Current values at this time are detected via the resistors $R_u$, $R_v$, and $R_w$ constituting the current detectors. The detected current values $I_u$, $I_v$, and $I_w$, which have been amplified by the amplifiers (Amp) $A_u$, $A_v$, and $A_w$ for the respective phases, are output to the microcomputer 1. The microcomputer 1 performs A/D conversion of the detected current values $I_u$, $I_v$, and $I_w$, thereby obtaining digital signals $DI_u$, $DI_v$, and $DI_w$, which indicate offset errors of the current detectors for the respective phases. Subsequently, the thus-obtained digital signals $DI_u$, $DI_v$, and $DI_w$ are stored in the storage device 2. The storage device 2 is implemented by, for instance, EE-PROM.

In step 12, detected current values of the current detectors for the U Phase and the V phase at the time of zero-crossing of the W-phase current are obtained.

The motor is driven, and when a level of a current value is relatively low as shown in FIG. 4, current values $I_{us}(t1)$ and $I_{us}(t2)$ detected by the current detector for the U phase, and $I_{vs}(t1)$ and $I_{vs}(t2)$ detected by the current detector for the V phase, at the time of zero-crossing of the W-phase current, are output to the microcomputer 1. The microcomputer 1 performs A/D conversion of the detected current values $I_{us}(t1)$, $I_{us}(t2)$, $I_{vs}(t1)$, and $I_{vs}(t2)$, thereby obtaining digital signal values $DI_{us}(t1)$, $DI_{us}(t2)$, $DI_{vs}(t1)$, and $DI_{vs}(t2)$. The thus-obtained signal values are stored in the storage device 2.

Similarly, digital signal values $DI_{um}(t1)$, $DI_{um}(t2)$, $DI_{vm}(t1)$, and $DI_{vm}(t2)$, at the time when the level of the current value is moderate as shown in FIG. 5, are obtained and stored in the storage device 2.

Furthermore, digital signal values $DI_{ub}(t1)$, $DI_{ub}(t2)$, $DI_{vb}(t1)$, and $DI_{vb}(t2)$, at the time when the level of the current value is relatively high as shown in FIG. 6, are obtained and stored in the storage device 2.

In step S13, correlation between the thus-obtained detected current values is obtained. More specifically, as shown in FIG. 8, absolute values of the digital signals—obtained through A/D conversion of the detected current values—are plotted in coordinates, which show actual current values of the motor M on the X axis and current values detected by the detectors on the Y axis.

As shown in FIG. 8, absolute values of the digital signals of detected U-phase and V-phase currents acquired when the actual current value of the motor is 0 ampere and those, which have been obtained in advance when the current value level is low, moderate, and high, are plotted. Meanwhile, with regard to the actual current values of the motor on the X-axis, it is necessary to select relatively high, moderate, and relatively low values, but not necessary to select specific accurate values.

Them, from the distribution of the plotted absolute values of the U-phase detected current values, the following straight line extending along the distribution is obtained.

$$DI_u=A_u\cdot I+B_u \tag{1}$$

where $B_u$ is a value detected when the U-phase current is 0 ampere, and corresponds to an offset error. Similarly, from the distribution of the plotted absolute values of the V-phase detected currents, the following straight line extending along the distribution is obtained.

$$DI_v=A_v\cdot i+B_v \tag{2}$$

where $B_v$ is a value detected when the V-phase current is 0 ampere, and corresponds to an offset error.

According to the equations (1) and (2), the following equation is obtained by eliminating "i" from the equation (1):

$$DI_u=(A_u/A_v)DI_v+B_u-(A_u/A_v)B_v \tag{3}$$

When this equation is expressed as an equation of V-phase current, which is corrected with using U-phase values as a reference, equation (4) can be obtained.

$$DI_{v(u)}=(A_u/A_v)DI_v+B_u-(A_u/A_v)B_v \tag{4}$$

When a V-phase current value detected by the current detector for the V phase is substituted into $DI_v$ in the equation (4), the V-phase detected value can be corrected to be the same value as the detected current value of the U phase, which is the reference phase.

Accordingly, a gap between the U-phase straight line and the V-phase straight line, that is, the offset error between the U phase and the V phase can be resolved.

In step 14, detected current values of the current detectors for the U Phase and the W phase at the time of zero-crossing of the V-phase current are obtained.

The motor is driven, and when the level of the current value is relatively low as shown in FIG. 4, current values $I_{us}(t1)$ and $I_{us}(t2)$ detected by the current detector for the U phase, and $I_{ws}(t1)$ and $I_{ws}(t2)$ detected by the current detector for the V phase, at the time of zero-crossing of the V-phase current, are output to the microcomputer 1. The microcomputer 1 performs A/D conversion of the detected current values $I_{us}(t1)$, $I_{us}(t2)$, $I_{ws}(t1)$, and $I_{ws}(t2)$, thereby obtaining digital signal values $DI_{us}(t1)$, $DI_{us}(t2)$, $DI_{ws}(t1)$, and $DI_{ws}(t2)$. The thus-obtained signal values are stored in the storage device 2.

Similarly, digital signal values $DI_{um}(t1)$, $DI_{um}(t2)$, $DI_{wm}(t1)$, and $DI_{wm}(t2)$, at the time when the level of the current value is moderate as shown in FIG. 5, are obtained and stored in the storage device 2.

Furthermore, digital signal values $DI_{ub}(t1)$, $DI_{ub}(t2)$, $DI_{wb}(t1)$, and $DI_{wb}(t2)$, at the time when the level of the current value is relatively high as shown in FIG. 6, are obtained and stored in the storage device 2.

In step S15, correlation between the thus-obtained detected current values is obtained. More specifically, as shown in FIG. 8, absolute values of the digital signals—obtained through A/D conversion of the detected current values—are plotted in coordinates, which show actual current values of the motor M on the X axis and current values detected by the detectors on the Y axis.

As shown in FIG. 10, absolute values of the digital signals of detected U-phase and W-phase currents acquired when the actual current value of the motor is 0 ampere and those, which have been obtained in advance when the current value level is low, moderate, and high, are plotted. Meanwhile, with regard to the actual current values of the motor on the X-axis, it is necessary to select relatively high, moderate, and relatively low values, but not necessary to select specific accurate values.

Them, from the distribution of the plotted absolute values of the U-phase detected current values, the following straight line extending along the distribution is obtained.

$$DI_u = A_u \cdot I + B_u \quad (1)$$

where $B_u$ is a value detected when the U-phase current is 0 ampere, and corresponds to an offset error. Similarly, from the distribution of the plotted absolute values of the W-phase detected currents, the following straight line extending along the distribution is obtained.

$$DI_w = A_w \cdot i + B_w \quad (5)$$

where $B_w$ is a value detected when the V-phase current is 0 ampere, and corresponds to an offset error.

According to the equations (1) and (5), the following equation is obtained by eliminating "i" from the equation (1):

$$DI_u = (A_u/A_w)DI_w + B_u - (A_u/A_w)B_w \quad (6)$$

When this equation is expressed as an equation of W-phase current, which is corrected with using U-phase values as a reference, equation (7) can be obtained.

$$DI_{w(u)} = (A_u/A_w)DI_w + B_u - (A_u/A_w)B_w \quad (7)$$

When a W-phase current value detected by the current detector for the W phase is substituted into $DI_w$ in the equation (7), the V-phase detected value can be corrected to be the same value as the detected current value of the U phase, which is the reference phase.

Accordingly, a gap between the U-phase straight line and the W-phase straight line, that is, the offset error between the U phase and the W phase can be resolved.

In step 16, the control of the electric motor is executed with using the detected current values obtained from the equations (1), (4) and (7).

In a case where an actual current value of a motor takes a certain value; for instance, a current value ($i_s$) of a low level, when current of one of the three phases is zero crossing, absolute values of detected current values of the remaining two phases should be equal to each other. However, those absolute values of the detected current values of the remaining two phases are not necessarily equal to each other as shown in FIGS. 8 to 10, due to variations in the detectors.

According to the invention, a detected current value is corrected on the basis of the above equations and absolute values of the corrected current values of the remaining two phases are made equal to each other. As a result, relative accuracy of the detected current values are enhanced.

Figure 12:
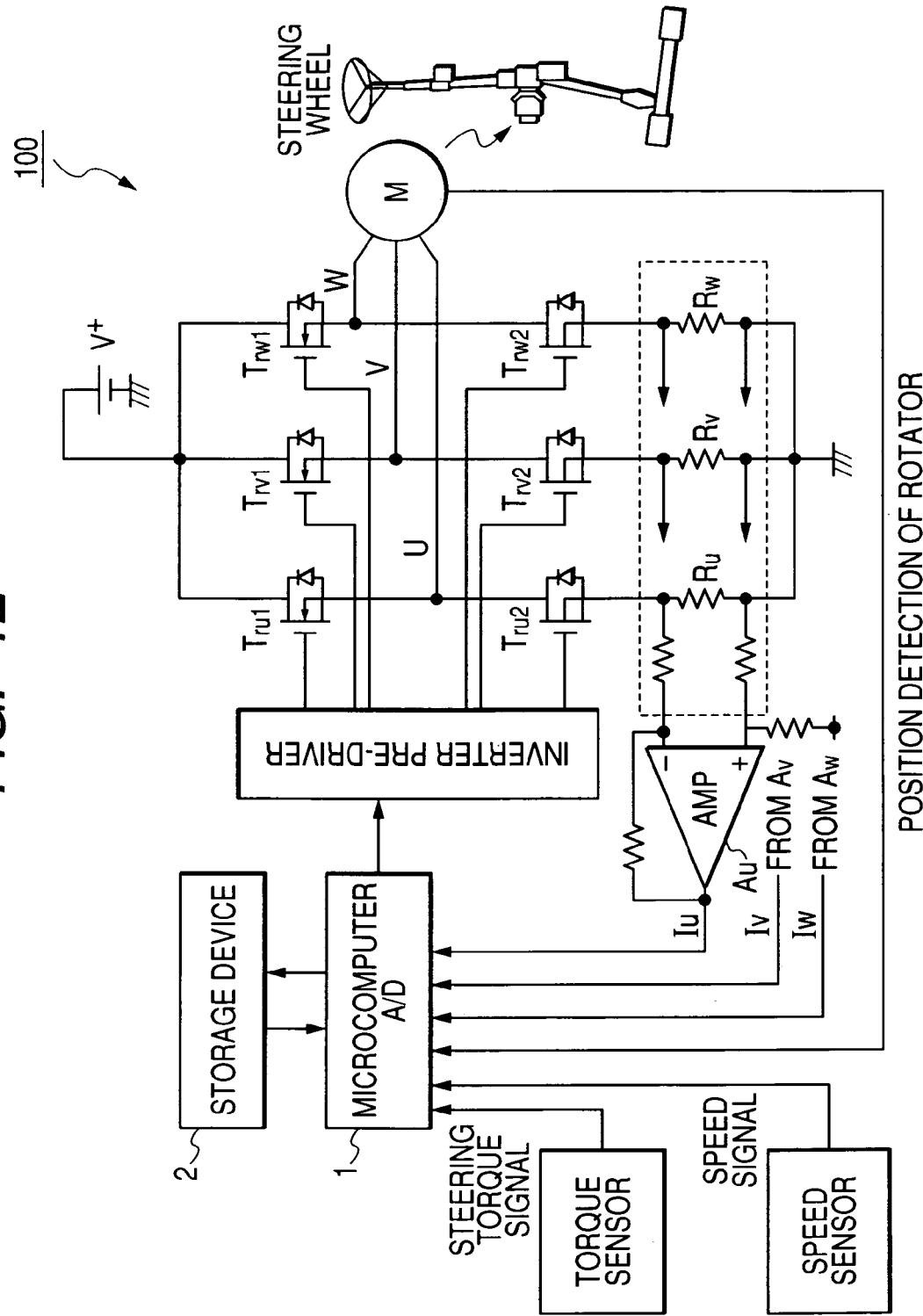
FIG. 12 is a view showing an overview of configuration of a control circuit for a power steering apparatus 100 to which the correcting method of the embodiment of the invention is applied.
Figure 13:
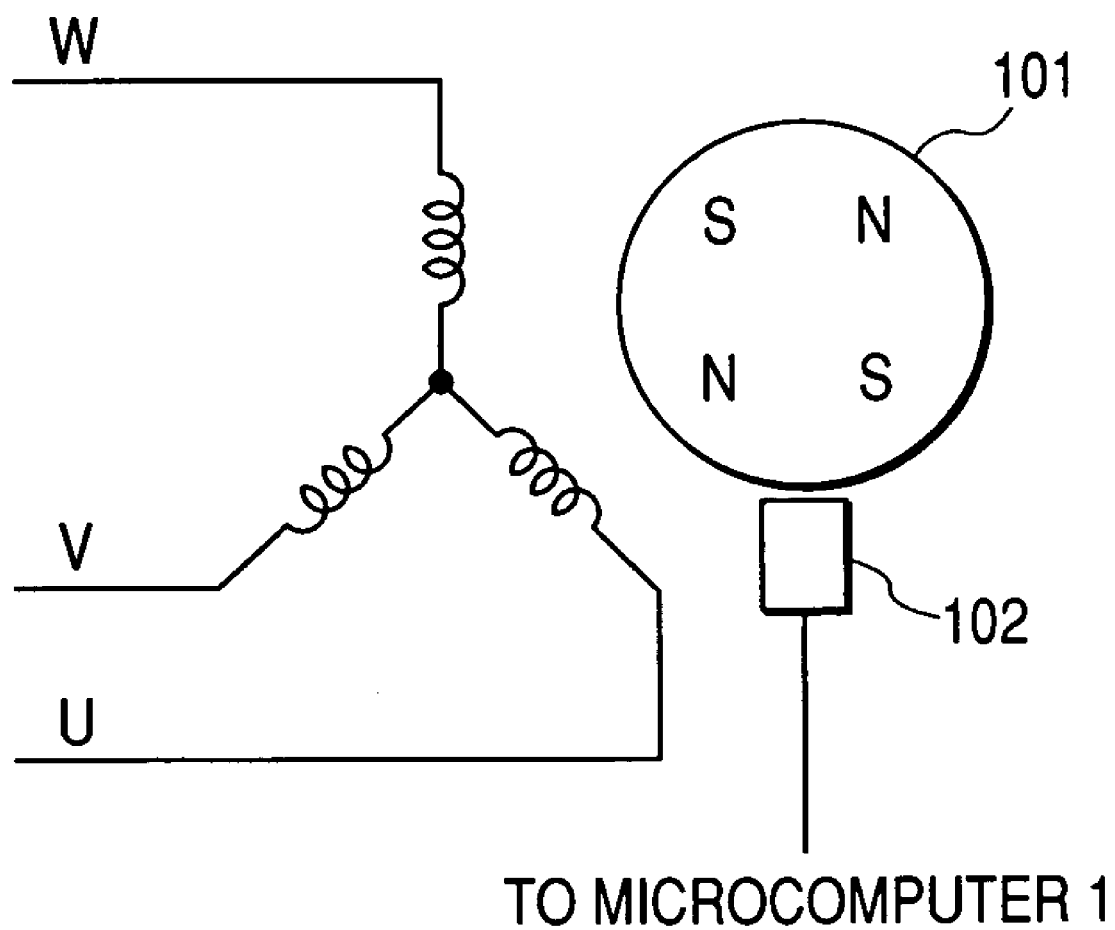
FIG. 13 is a view showing an overview of configuration of a rotator 101 included in the electric motor shown in FIG. 12.

Meanwhile, the invention can be applied to any device, so long as a device has a three-phase electric motor. Preferably, the invention is applied to a power steering apparatus for assisting steering operation of a vehicle by means of a three-phase electric motor, whereby a smooth, torque-ripple-free steering operation can be provided to a user. FIG. 12 is a view showing an overview of configuration of a control circuit for a power steering apparatus 100 to which the correcting method of the embodiment of the invention is applied. FIG. 12 shows the circuit shown in FIG. 3 in more detail. In FIG. 12, the circuit shown in FIG. 3 is applied to the power steering apparatus 100. Also, FIG. 13 is a view showing an overview of configuration of a rotator 101 included in the electric motor shown in FIG. 12. The power steering apparatus 100 includes a three-phase electric motor M and a control circuit therefor, which are similar to those shown in FIG. 3. The FETs Tru1, Tru2, Trv1, Trv2, Trw1, Trw2 in FIG. 12 may be of N-channel FETs, each of which is turned on when a gate voltage thereof is higher than a source voltage thereof. Each of FETs Tru1, Tru2, Trv1, Trv2, Trw1, Trw2 is connected to a diode in parallel. The power steering apparatus 100 also includes a position detection sensor 102, which detects a position of the rotator 101. The microcomputer 1 is connected to the position detection sensor 102, a torque sensor, a speed sensor, the amplifiers Au, Av, Aw and an inverter pre-driver. It is assumed that the U phase is used as a reference phase. When a current value of the W phase is zero-crossing, the microcomputer 1 corrects a detected current value of the V phase so that an absolute value of the corrected current value of the V phase is equal to an absolute value of a current value of the U phase. Similarly, when the current value of the V phase is zero-crossing, the microcomputer 1 corrects a detected current value of the W phase so that an absolute value of the corrected current value of the W phase is equal to an absolute value of the U phase. This correcting method made by the microcomputer 1 of the modified embodiment is similar to that already described in the above embodiments. Therefore, detailed description thereon is omitted here. When controlling the power steering apparatus 100, the microcomputer 1 also utilizes a steering torque signal from the torque sensor, a speed signal from the speed sensor, and a position signal from the position detection sensor 102.

What is claimed is:

1. An apparatus for correcting a current value of a three-phase electric motor including a current detector that detects current of each of three phases including a first phase, a second phase, and a third phase, the apparatus comprising:
a current-value correcting unit that, when current of one of the first to third phase is zero-crossing, corrects a current value of at least one of the others of the first to third phases on a basis of a correlation between detection values of the current detectors provided for the others of the first to third phases during a period in which the three-phase electric motor is operating.

2. The apparatus according to claim 1, wherein the current-value correcting unit corrects the current value of the at least one of the second phase and the third phase on a basis of one of (a) a correlation between the detection values of the current detectors provided for the second and third phases at a time of the zero-cross of the current of the first phases in a course of rising and (b) a correlation between the detection values of the current detectors provided for the second and third phases at a time of the zero-cross of the current of the first phases in a course of falling.

3. The apparatus according to claim 1, wherein:
the current-value correcting unit obtains the detection values of the current detectors provided for the second and third phases when a current value of the three-phase electric motor is equal to a first value, a second value or a third value; and
the first value>the second value>the third value.

4. The apparatus according to claim 1, further comprising:
a storage unit that stores detection values of the current detectors provided for the respective first, second and third phases when current of the three-phase electric motor is equal to 0 ampere, wherein:
when current of one of the three phases is equal to a corresponding detection value stored in the storage unit, the current-value correcting unit determines that the one of the three phases is zero-crossing.

5. The apparatus according to claim 1, wherein:
when the current value of the first phase is zero-crossing, the current-value correcting unit corrects the current value of the third phase to make an absolute value of the current value of the third phase be equal to an absolute value of the current value of the second phase; and
when the current value of the third phase is zero-crossing, the current-value correcting unit corrects the current value of the first phase to make an absolute value of the current value of the first phase be equal to the absolute value of the current value of the second phase.

6. A method for correcting a current value of a three-phase electric motor including a current detector that detects current of each of three phases including a first phase, a second phase, and a third phase, the method comprising:
when current of one of the first to third phase is zero-crossing, correcting a current value of at least one of the others of the first to third phases on a basis of a correlation between detection values of the current detectors provided for the others of the first to third phases during a period in which the three-phase electric motor is operating.

7. An electric-power-steering control apparatus for correcting a current value of a three-phase electric motor including a current detector that detects current of each of three phases including a first phase, a second phase, and a third phase, the apparatus comprising:
a current-value correcting unit that when current of one of the first to third phase is zero-crossing, corrects a current value of at least one of the others of the first to third phases on a basis of a correlation between detection values of the current detectors provided for the others of the first to third phases during a period in which the three-phase electric motor is operating.

8. A three-phase electric motor system comprising:
a three-phase electric motor;
a current detector that detects current of each of three phases including a first phase, a second phase, and a third phase; and
a current-value correcting unit that, when current of one of the first to third phase is zero-crossing, corrects a current value of at least one of the others of the first to third phases on a basis of a correlation between detection values of the current detectors provided for the others of the first to third phases during a period in which the three-phase electric motor is operating.

9. The system according to claim 8, wherein:
when the current value of the first phase is zero-crossing, the current-value correcting unit corrects the current value of the third phase to make an absolute value of the current value of the third phase be equal to an absolute value of the current value of the second phase; and
when the current value of the third phase is zero-crossing, the current-value correcting unit corrects the current value of the first phase to make an absolute value of the current value of the first phase be equal to the absolute value of the current value of the second phase.

* * * * *